(12) United States Patent
Nakashima et al.

(10) Patent No.: US 7,914,917 B2
(45) Date of Patent: Mar. 29, 2011

(54) HYBRID POWER SUPPLY UNIT

(75) Inventors: Takuya Nakashima, Osaka (JP); Tadao Kimura, Hyogo (JP); Gota Asano, Osaka (JP)

(73) Assignee: Panasonic Corporation, Osaka (JP)

(*) Notice: Subject to any disclaimer, the term of this patent is extended or adjusted under 35 U.S.C. 154(b) by 1108 days.

(21) Appl. No.: 11/653,339

(22) Filed: Jan. 16, 2007

(65) Prior Publication Data

US 2007/0166574 A1 Jul. 19, 2007

(30) Foreign Application Priority Data

Jan. 16, 2006 (JP) .................. 2006-007374

(51) Int. Cl.
*H01M 16/00* (2006.01)
(52) U.S. Cl. ................................. 429/3; 429/9
(58) Field of Classification Search ............ 429/3, 9
See application file for complete search history.

(56) References Cited

U.S. PATENT DOCUMENTS

| | | | |
|---|---|---|---|
| 5,108,848 A * | 4/1992 | Kramer .................. | 429/9 |
| 6,781,343 B1 | 8/2004 | Demachi et al. | |
| 2003/0222502 A1 | 12/2003 | Takahashi et al. | |

FOREIGN PATENT DOCUMENTS

| | | |
|---|---|---|
| JP | 8-308103 | 11/1996 |
| JP | 2004-48913 | 2/2004 |
| JP | 2004-56995 | 2/2004 |
| JP | 2005-293977 | 10/2005 |
| WO | WO 02/25761 A1 | 3/2002 |

OTHER PUBLICATIONS

Chinese Office Action, with English translation, issued in Chinese Patent Application No. 200710001755.3, mailed Jun. 26, 2009.

* cited by examiner

*Primary Examiner* — Stephen J. Kalafut
(74) *Attorney, Agent, or Firm* — McDermott Will & Emery LLP

(57) ABSTRACT

A hybrid power supply unit, comprises a high-capacity nonaqueous electrolyte battery group and a high-power nonaqueous electrolyte battery group different in discharge characteristics connected to each other in parallel. The high-capacity nonaqueous electrolyte battery group has a 0.2 C discharge capacity per cell greater than that of the high-power nonaqueous electrolyte battery group, and the high-power nonaqueous electrolyte battery group has a rate of 5 C discharge capacity per cell to 0.2 C discharge capacity per cell (5 C discharge capacity/0.2 C discharge capacity) greater than that of the high-capacity nonaqueous electrolyte battery group.

4 Claims, 2 Drawing Sheets

HYBRID POWER SUPPLY UNIT

BACKGROUND OF THE INVENTION

1. Field of the Invention

The present invention relates to a power supply unit for use in the fields of portable appliances such as cellphone and personal computer, power tools such as electric tool and vacuum cleaner, power generation such as for electric car, electric industrial vehicle, electric bike, electric-assisted bicycle, electric wheelchair, and electric robot, system power supplies such as load leveling, peak shift, and backup, and others, and in particular, to improvement in the performance thereof.

2. Description of the Related Art

In contrast to portable appliances such as cellphone and personal computer, appliances in the power tool field such as electric tool and in the power field such as for electric bike demand power supply having high power and high capacity, because fluctuation in the load to power supply is greater and continuous long-term operation is needed.

It is generally difficult to make a battery higher both in capacity and power, because these properties are antinomic to each other. For example, a nonaqueous electrolyte battery such as lithium-ion secondary battery, a typical example of high-capacity secondary battery, allows continuous long-term discharge at a low load of approximately 0.2 C, and thus is mainly used as a power supply unit for portable appliances, but the current density per electrode area at such a low load is only about 0.01 $A/cm^2$. For that reason, such a high-capacity nonaqueous electrolyte battery is not suitable as a high-load power supply that is used in the power field, for example for electric bike, electric-assisted bicycle, and others, that is desirably discharged at large current, specifically at a current density of 0.1 $A/cm^2$ or more. In addition, pulse discharge characteristics at large current is important in the power field, because the power supply is turned on and off frequently, but the high-capacity nonaqueous electrolyte batteries used, for example, in portable appliances do not have favorable pulse discharge capacity. On the other hand, high-power power supplies such as capacitor allow discharge at large current, but the capacity is extremely limited, which makes continuous long-term discharge difficult.

Thus, it has been difficult to obtain a power supply satisfying such requirements in both properties with a single battery, and hybrid power supply units in combination of a long-term small-power power supply and a short-term large-power power supply have been proposed and studied for commercialization. For example, hybrid power supply units using a secondary cell such as lead battery, NiCd battery, nickel metal-hydride battery, lithium ion battery or a fuel cell as the long-term small-power power supply and a capacitor (condenser) as the short-term large-power power supply were proposed (Japanese Unexamined Patent Publication Nos. 8-308103, 2004-48913, and 2004-56995, and WO 2002/025761 Pamphlet).

Japanese Unexamined Patent Publication No. 8-308103 discloses a hybrid power supply unit having a battery, a large-capacity condenser, and a current control circuit, in which the efficiency of the battery is controlled by the current control circuit in such a manner that the battery discharge current supplied to the load at large load becomes as close as possible to the sum of the battery discharge current supplied to the load at low load current and the charge current flowing from the battery to capacitor. Alternatively, Japanese Unexamined Patent Publication No. 2004-48913 proposes a power supply in which an auxiliary power supply is connected to the main battery unit in parallel, a voltage-raising means is connected to the auxiliary power supply in series, and thus, the secondary cell is charged efficiently. Yet alternatively, WO 2002/025761 Pamphlet proposes a hybrid power supply unit having a fuel battery and a unit secondary battery connected in series, as well as a means of detecting residual capacity and a means of controlling a charge for the unit secondary battery. Yet alternatively, Japanese Unexamined Patent Publication No. 2004-56995 proposes a hybrid power supply unit having an electrical double-layer capacitor containing a pair of capacitor terminals, an energy storage device, and first and second bidirectional DC/DC converters.

However, the conventional hybrid power supply units proposed in Japanese Unexamined Patent Publication Nos. 8-308103, 2004-48913, and 2004-56995, and WO 2002/025761 Pamphlet employed the combination of different kinds of power supply units or different kinds of parts, and thus, demanded a complicated control system such as current-controlling circuit, voltage-increasing means, residual capacity-detecting means, charge-controlling means, and bidirectional DC/DC converter, for optimized operation of these different kinds of power supplies and different kinds of parts.

SUMMARY OF THE INVENTION

An object of the present invention, which was made in view of the problems above, is to provide a power supply unit, with the same kinds of batteries, satisfying the requirements in high-capacity characteristics allowing continuous long-term discharge and also in high-power characteristics allowing pulse discharge at large current at the same time, without use of a hybrid power supply having multiple kinds of power supplies demanding a complicated control system.

According to an aspect of the present invention, a hybrid power supply unit, comprises a high-capacity nonaqueous electrolyte battery group and a high-power nonaqueous electrolyte battery group different in discharge characteristics connected to each other in parallel. The high-capacity nonaqueous electrolyte battery group has a 0.2 C discharge capacity per cell greater than that of the high-power nonaqueous electrolyte battery group, and the high-power nonaqueous electrolyte battery group has a rate of 5 C discharge capacity per cell to 0.2 C discharge capacity per cell (5 C discharge capacity/0.2 C discharge capacity) greater than that of the high-capacity nonaqueous electrolyte battery group.

These and other objects, features, aspects, and advantages of the present invention will become more apparent upon reading the following detailed description along with the accompanying drawings.

DETAILED DESCRIPTION OF THE PREFERRED EMBODIMENTS

Embodiment 1

Figure 1:
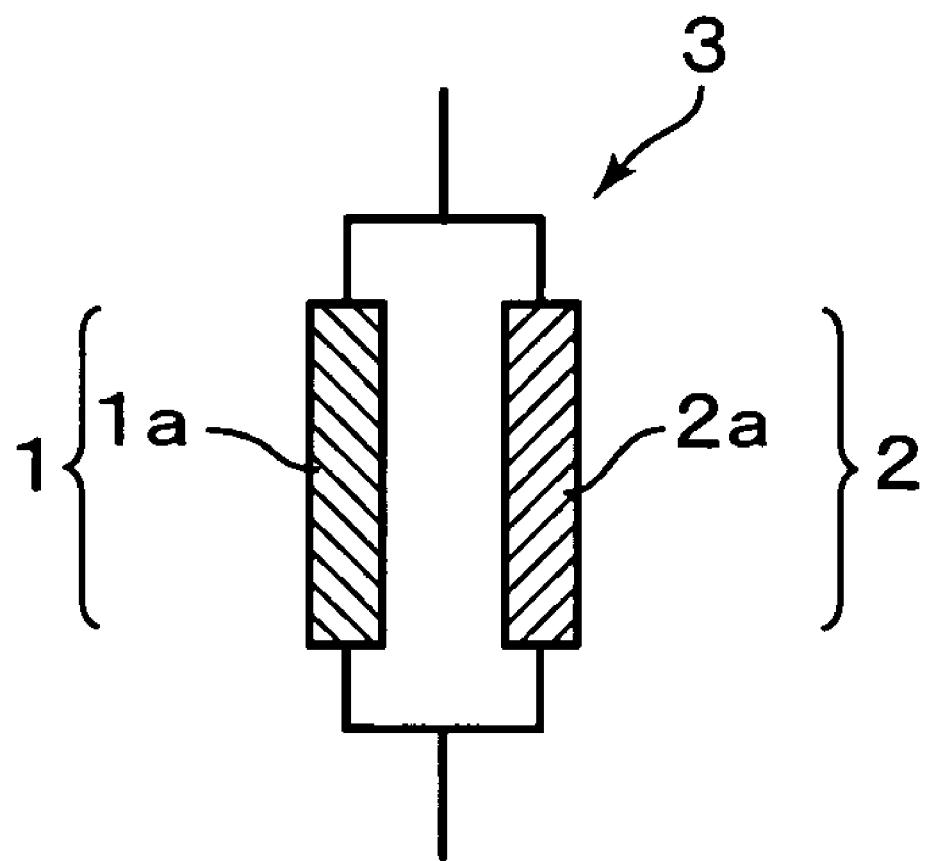
FIG. 1 is a schematic view illustrating an example of the hybrid power supply unit according to an embodiment 1 of the present invention.

FIG. 1 is a schematic view illustrating a hybrid power supply unit 3 in the present embodiment. The hybrid power supply unit 3 shown in FIG. 1 comprises a high-capacity nonaqueous electrolyte battery group 1 and a high-power nonaqueous electrolyte battery group 2 connected to each other in parallel, and each of the battery groups contains a cell, respectively nonaqueous electrolyte cells 1a and 2a.

The hybrid power supply unit in the present embodiment is characterized in that the nonaqueous electrolyte cell 1a in the high-capacity nonaqueous electrolyte battery group 1 and the nonaqueous electrolyte cell 2a in the high-power nonaqueous electrolyte battery group 2 are different in discharge characteristics from each other. Specifically, the hybrid power supply unit 3 is so designed that the nonaqueous electrolyte cell 1a has a discharge capacity at a low load of 0.2 C greater than that of the nonaqueous electrolyte cell 2a but the nonaqueous electrolyte cell 2a has a ratio of the discharge capacity at a high load of 5 C to that at 0.2 C (5 C discharge capacity/0.2 C discharge capacity) greater than that of the nonaqueous electrolyte cell 1a. The 0.2 C or 5 C discharge capacity is a capacity of a cell when the cell is charged to the voltage equivalent to the full charge in a device used and then discharged to the cut-off voltage of discharge at a discharge current of 0.2 C or 5 C with respect to its theoretical capacity.

Normally, nonaqueous electrolyte batteries used in low-load applications such as portable appliances show high capacity and are superior in discharge characteristics at a low load of 0.2 C, but, when used as a power supply, for example, for an electric-assisted bicycle or electric bike, such a battery does not permit sufficient discharge and even cannot discharge when the load is greater, because discharge at a large current of 5 C or more is needed at initial start up or on a slope road. Accordingly, the hybrid power supply unit 3 contains a high-capacity nonaqueous electrolyte cell 1a and also a high-power nonaqueous electrolyte cell 2a in combination, for enabling sufficient discharge even under high load. In this configuration, during discharge of large current, the high-power nonaqueous electrolyte cell 2a supplies most of the large current. During discharge of small current, discharge is performed both by the high-capacity nonaqueous electrolyte cell 1a superior in high-load characteristics and the high-power nonaqueous electrolyte cell 2a, and, because the batteries are connected to each other in parallel, the high-power nonaqueous electrolyte cell 2a is charged by the high-capacity nonaqueous electrolyte cell 1a with the electric charge in an amount needed for equilibration in electric potential.

When large current is discharged, the lithium ion concentration increases in the region around the negative electrode and decreases in the region around the positive electrode, causing uneven distribution of lithium ion in the nonaqueous electrolyte battery. Especially in the power supply field in which power supply is frequently turned on and off repeatedly, pulse discharge at large current is performed. In such a case, the uneven distribution of lithium ion is amplified in the battery, consequently leading to voltage drop and deterioration in pulse discharge capacity. In the hybrid power supply unit 3 of the present embodiment, large current is discharged from the high-power nonaqueous electrolyte cell 2a when the discharge is turned on, and electricity is charged from the high-capacity nonaqueous electrolyte cell 1a to the high-power nonaqueous electrolyte cell 2a when the discharge is turned off; and thus, the distribution of lithium ion in the battery is uniformized rather positively, compared to power supply units having only one nonaqueous electrolyte cell in which no such charging is possible. Thus, even when pulse discharge at large current is performed, the voltage drop and the deterioration in pulse discharge capacity are prevented, compared to power supplies containing only a high-capacity or high-power nonaqueous electrolyte cell.

In the present embodiment, the discharge characteristics of the nonaqueous electrolyte cell 1a in the high-capacity nonaqueous electrolyte battery group 1 or the nonaqueous electrolyte cell 2a in the high-power nonaqueous electrolyte battery group 2 may be controlled, for example, by adjusting the kind of the positive-electrode active material and the composition of the positive electrode mixture. It is preferable then to change the rate of the positive-electrode active material to the current collector in the positive electrode by modifying the coating amount of the positive-electrode active material, because it makes possible to easily adjust the discharge capacities at low and high loads by using the same kind of positive-electrode active material. For example, in a lithium-ion secondary battery, a typical high-capacity nonaqueous electrolyte battery used in portable appliances, the plate area of the positive electrode per capacity is less than 200 cm$^2$/Ah, but it is possible to change the volume rate of the electrode active material to the current collector in the positive electrode, by increasing the plate area per capacity and to obtain a high-power nonaqueous electrolyte cell different in discharge characteristics.

In preparing the nonaqueous electrolyte batteries different in discharge characteristics by using the same positive-electrode active material and changing the plate area per capacity as described above in the present embodiment, it is preferable to use a nonaqueous electrolyte cell having a positive electrode with a plate area per capacity of less than 200 cm$^2$/Ah as the high-capacity nonaqueous electrolyte cell and a nonaqueous electrolyte cell having a positive electrode with a plate area per capacity of 200 cm$^2$/Ah or more and 800 cm$^2$/Ah or less as the high-power nonaqueous electrolyte cell.

For example, when a typical positive-electrode active material lithium cobaltate is used, the positive electrode above having a plate area per capacity of 200 cm$^2$/Ah or less can be prepared, by adjusting the coating amount of the positive-electrode active material applied on one side to 17.8 mg/cm$^2$ or more. Alternatively, the positive electrode having a plate area per capacity of 200 cm$^2$/Ah or more and 800 cm$^2$/Ah or less can be prepared by using the same active material and adjusting the coating amount of the positive-electrode active material applied on one side to 4.4 to 17.7 mg/cm$^2$.

In preparing the nonaqueous electrolyte batteries different in discharge characteristics by changing the plate area per capacity in the present embodiment, the difference in the plate area per capacity between the positive electrodes of the high-capacity nonaqueous electrolyte cell 1a and the high-power nonaqueous electrolyte cell 2a is selected properly according to the characteristics of the devices used, but it is preferably more than 100 cm$^2$/Ah. When the difference in the plate area per capacity between the positive electrodes of the high-capacity and high-power nonaqueous electrolyte cells is smaller, there may be no sufficient difference in discharge characteristics between at low and high loads.

In the present embodiment, any known material may be used as the material for the positive electrode. Typical examples of the positive-electrode active materials include lithium/transition metal composite oxides such as lithium cobaltate, lithium nickelate, and lithium manganate. Typical examples of the binders include polyvinylidene fluoride (PVDF), polytetrafluoroethylene (PTFE), and the like, as well as rubber-based binders such as polyacrylic acid-derived rubber particles (trade name: BM-500B, manufactured by Zeon Corporation). When PTFE or BM-500B is used as the binder, a thickener, such as carboxymethylcellulose (CMC), polyethyleneoxide (PEO), or a modified acrylonitrile rubber (trade name: BM-720H, manufactured by Zeon Corporation), is preferably used in combination. The amounts of the binder and the thickener added are not particularly limited, but, the binder is preferably added in an amount of 0.1 to 5 parts by mass and the thickener in an amount of 0.1 to 5 parts by mass, with respect to 100 parts by mass of the positive-electrode active material. In the present embodiment, a conductive substance and others may also be added as other components. Typical examples of the conductive substances include acetylene black (AB), Ketjen black, various graphites, and the like. These conductive substances may be used alone or in combination of two or more.

In the present embodiment, the positive electrode is prepared by preparing a paste by mixing a positive-electrode active material, a binder, and a thickener and a conductive substance as needed in a solvent such as N-methylpyrrolidone (NMP), and coating the paste, for example, on an aluminum current collector having a thickness of 10 to 50 μm in such a manner that the positive-electrode active material and the current collector have particular thicknesses in each positive electrode, followed by drying, rolling the dried coating, and cutting into predetermined pieces.

In the present embodiment, any known material may be used for the negative electrode. Typical examples of the negative-electrode active materials for use include various natural graphites, various artificial graphites, silicon-containing composite materials, various alloy materials, and the like. Typical examples of the binders include styrene-butadiene copolymers (SBR), acrylic acid-modified SBR, and the like. A thickener of water-soluble polymer may also be used additionally as other component. Typical examples of the water-soluble polymers include cellulosic resins, and, among them, CMC is preferable. The amounts of the binder and the thickener added are not particularly limited, but, the binder is preferably added in an amount of 0.1 to 5 parts by mass, and the thickener in an amount of 0.1 to 5 parts by mass, with respect to 100 parts by mass of the negative-electrode active material.

In the present embodiment, the negative electrode can be prepared by forming a paste by mixing a negative-electrode active material, a binder, and a thickener and a conductive substance as needed in a solvent such as N-methylpyrrolidone (NMP), and coating the paste, for example, on a copper current collector having a thickness of 10 to 50 μm to a particular thickness, followed by drying, rolling, and cutting into pieces. The nonaqueous electrolyte battery according to the present embodiment is limited by the positive electrode capacity, in other words, the negative electrode capacity being greater than the positive electrode capacity.

Then, the positive and negative electrodes thus prepared are disposed to face each other via a separator, and rolled up or layered to give an electrode assembly having a structure in which the electrodes are wound or laminated.

The separator for use in the present embodiment is preferably a microporous resin film having a melting point of 200° C. or lower. Among such resins, a separator of polyethylene, polypropylene or a mixture or copolymer of polyethylene and polypropylene is more preferable. When the battery is externally short-circuited, such a separator raises a resistance of the battery by being melted, reduces a short-circuit current, and thus, prevents overheating of the battery by heat generation. The thickness of the separator is preferably in the range of 10 to 40 μm for preservation of favorable ionic conduction and energy density.

The electrode assembly thus prepared is connected to the current collector plate for collection of current from each electrode. For connection to the current collector plate, for example, a method of forming an area exposed to the current collector at the terminal of each electrode in the width direction and connecting the exposed area with the current collector plate at multiple points may be used.

The nonaqueous electrolyte for use in the present embodiment is preferably, for example, a solution of one or more lithium salts such as LiPF$_6$ and LiBF$_4$ dissolved in a nonaqueous solvent. Typical examples of the nonaqueous solvents include ethylene carbonate (EC), propylene carbonate (PC), dimethyl carbonate (DMC), diethyl carbonate (DEC), methyl ethyl carbonate (MEC), and the like. The nonaqueous solvents may be used alone, but combined use of two or more solvents is preferable. In addition, vinylene carbonate (VC), cyclohexylbenzene (CHB), or a derivative of VC or CHB may be added thereto, for forming a film on the surface of the active materials in the positive electrode and/or the negative electrode and thus assuring, for example, stability during overcharging. The nonaqueous electrolyte used in the present embodiment may not be a liquid electrolyte but a gel or solid electrolyte.

The nonaqueous electrolyte cell in the present embodiment is produced in a step of filling the electrode assembly and nonaqueous electrolyte thus prepared into a battery can and sealing its opening.

Embodiment 2

Figure 2A:
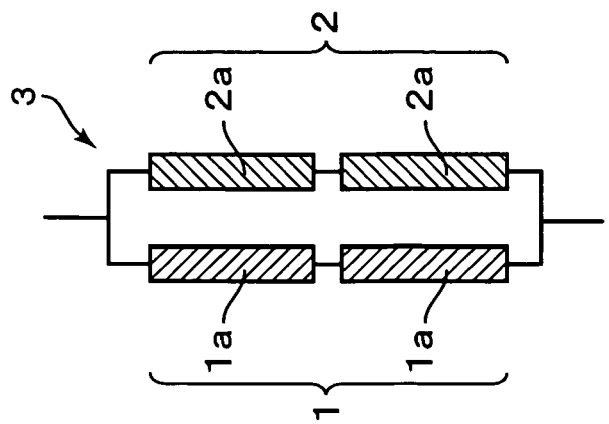
FIG. 2A is a schematic view illustrating an example of the hybrid power supply unit according to an embodiment 2 of the present invention, wherein a high-capacity nonaqueous electrolyte battery group 1 containing two nonaqueous electrolyte cells 1a connected to each other in parallel and a high-power nonaqueous electrolyte battery group 2 containing a nonaqueous electrolyte cell 2a are connected to each other in parallel.
Figure 2B:
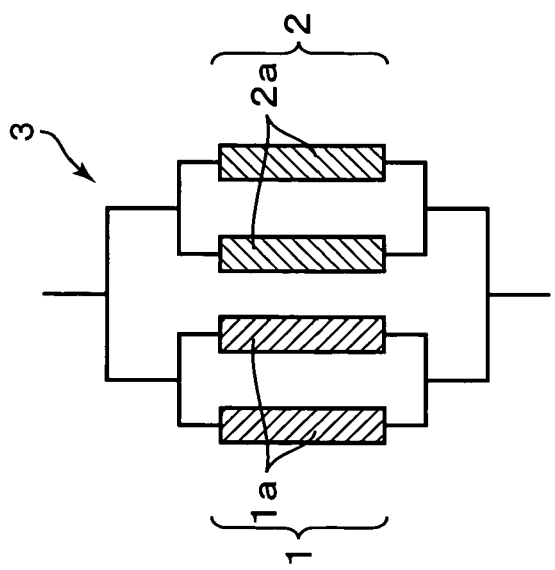
FIG. 2B is a schematic view illustrating another example of the hybrid power supply unit according to the embodiment 2 of the present invention, wherein the high-capacity nonaqueous electrolyte battery group 1 and the high-power nonaqueous electrolyte battery group 2 are connected to each other in parallel, respectively containing two nonaqueous electrolyte cells 1a and 2a connected to each other in parallel.
Figure 2C:
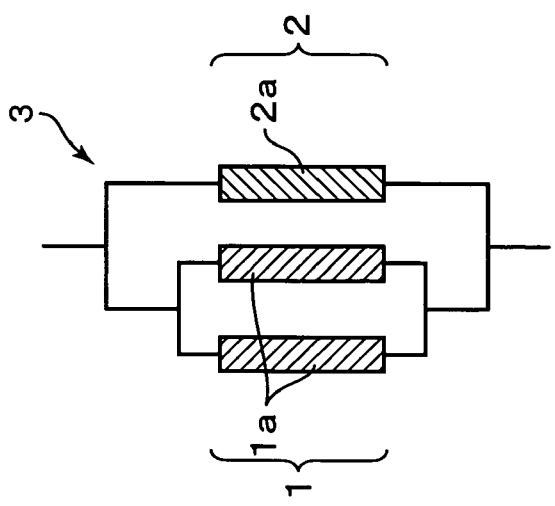
FIG. 2C is a schematic view illustrating yet another example of the hybrid power supply unit according to the embodiment 2 of the present invention, wherein the high-capacity nonaqueous electrolyte battery group 1 and the high-power nonaqueous electrolyte battery group 2 are connected to each other in parallel, respectively containing two non-aqueous electrolyte cells 1a and 2a connected to each other in series.

In the hybrid power supply unit in the present embodiment, at least one of the high-capacity and high-power nonaqueous electrolyte battery groups may contain multiple nonaqueous electrolyte cells. FIGS. 2A to 2C are schematic views illustrating examples of the hybrid power supply unit in the present embodiment. The discharge characteristics and configuration, for example of electrodes, of each nonaqueous electrolyte cell for use in the present embodiment are the same as those for each nonaqueous electrolyte cell described in embodiment 1, and thus, repeated description thereof will be omitted, and only features different from those in embodiment 1 will be described herein.

FIG. 2A shows a hybrid power supply unit in which a high-capacity nonaqueous electrolyte battery group 1 contains two nonaqueous electrolyte cells 1*a* connected to each other in parallel and the high-capacity nonaqueous electrolyte battery group 1 is connected in parallel to a high-power nonaqueous electrolyte battery group 2 containing a nonaqueous electrolyte cell 2*a*. In such a configuration, the high-capacity nonaqueous electrolyte battery group 1, which contains multiple nonaqueous electrolyte cells 1*a* connected to each other in parallel, provides a power supply unit favorable for use in applications demanding large battery capacity at low load.

FIG. 2B shows another hybrid power supply unit in which the high-capacity nonaqueous electrolyte battery group 1 and the high-power nonaqueous electrolyte battery group 2 are connected to each other in parallel and have respectively two nonaqueous electrolyte cells 1a and 2a connected to each other in parallel. Such a configuration leads to increase in capacity both at low and high loads, and thus, the power supply unit may be used favorably in applications demanding large battery capacity at both discharge loads.

FIG. 2C shows yet another hybrid power supply unit in which the high-capacity nonaqueous electrolyte battery group 1 and the high-power nonaqueous electrolyte battery group 2 are connected to each other in parallel and have respectively two nonaqueous electrolyte cells 1a and 2a connected to each other in series. Such a configuration leads to battery voltages different in respective battery groups and thus, the power supply unit is favorably used in applications demanding high voltage both at low and high loads.

In FIGS. 2A to 2C, the battery groups containing multiple cells are shown as batteries having two cells, but the number of the cells may be altered as needed according to the requirements in characteristics of the device for use. Also in FIGS. 2A to 2C, the cells are connected only in parallel or in series in respective battery groups, but the connection form may be altered according to the requirements in characteristics of the devices for use. For example, cells in one battery group may be connected in parallel and cells in other battery group in series.

Although the present invention has been described in terms of the presently favorable embodiments, such embodiments are illustrative in all aspects and are not to be interpreted as restrictive. It is to be construed that an unlimited number of modifications not described above are embodied without departing from the scope of the present invention.

Hereinafter, the present invention will be described more specifically with reference to Examples, but it should be understood that the present invention is not limited by these embodiments.

EXAMPLES

<Preparation of Cell>
(Lithium-ion Secondary Cell A)

30 kg of lithium cobaltate, 10 kg of PVDF #1320 manufactured by Kureha Chemical Industry Co., Ltd. (N-methylpyrrolidone (NMP) solution containing 12 parts by mass of solid matter), 900 g of acetylene black, and a suitable amount of NMP were blended in a double shaft blender, to give a positive electrode paste. The paste was coated on both surfaces of an aluminum foil having a thickness of 15 µm except its terminal in the width direction for forming an exposed terminal to be connected to the current collector plate to an active material amount on one surface of 35.3 mg/cm$^2$, and then dried and rolled to give a strip having a total thickness of 215 µm. The obtained strip was cut into a piece of 56 mm in width and 411 mm in length, to give a positive electrode.

Separately, 20 kg of a synthetic graphite, 750 g of an acrylic acid-modified SBR manufactured by Zeon Corporation, BM-400B (trade name, solid matter: 40 parts by mass), 300 g of CMC, and a suitable amount of water were blended in a double shaft blender, to give a negative electrode paste. The paste was coated on both surfaces of a copper foil having a thickness of 10 µm except the exposed terminal area of the copper foil in the width direction, in the similar way to the positive electrode paste above, to an active material amount on one surface of 16.0 mg/cm$^2$, followed by drying and rolling, to give a strip having a total thickness of 215 µm. The strip was cut into a piece of 58 mm in width and 471 mm in length, to give a negative electrode.

The positive and negative electrodes were wound with a polyethylene microporous separator (9420G, manufactured by Asahi Kasei Corp.) disposed therebetween, to give a cylindrical electrode assembly. The bare aluminum foil carrying no positive electrode paste was directed to the cap face of the battery can in which the electrode assembly is placed and the bare copper foil carrying no negative electrode paste to the bottom face. An aluminum current collector plate (thickness: 0.3 mm) was welded to the aluminum foil area of the positive electrode and an iron current collector plate (thickness 0.3 mm) to the copper foil area of the negative electrode, and the electrode assembly was placed in a cylindrical battery case of 18 mm in diameter and 68 mm in height. Then, 5 g of a nonaqueous electrolyte containing 1.0M LiPF$_6$ in a mixed EC and EMC solvent (volume ratio 1:3) was poured into the battery case, and the opening was sealed, to give a cylindrical lithium-ion secondary cell A having an electrode assembly diameter corresponding to 95% of the battery case internal diameter, a theoretical capacity of 2,300 mAh, and a positive-electrode plate area per capacity of 100 cm$^2$/Ah.

(Lithium-ion Secondary Cell B)

A cylindrical lithium-ion secondary cell B having a theoretical capacity of 2,000 mAh and a positive-electrode plate area per capacity of 150 cm$^2$/Ah was prepared in a similar manner to lithium-ion secondary cell A, except that, in preparation of the lithium-ion secondary cell A, the positive electrode was prepared to have an active material amount on one surface of 22.8 mg/cm$^2$, a total thickness after rolling of 144 µm, and a length after cutting of 536 mm and the negative electrode to have an active material amount of 17.2 mg/cm$^2$, a total thickness of 141 µm and a length of 596 mm.

(Lithium-ion Secondary Cell C)

A cylindrical lithium-ion secondary cell C having a theoretical capacity of 1,800 mAh and a positive-electrode plate area per capacity of 200 cm$^2$/Ah was prepared in a similar manner to lithium-ion secondary cell A, except that, in preparation of the lithium-ion secondary cell A, the positive electrode was prepared to have an active material amount on one surface of 17.7 mg/cm$^2$, a total thickness after rolling of 115 µm, and a length after cutting of 643 mm, and the negative electrode to have an active material amount of 15.0 mg/cm$^2$, a total thickness of 111 µm, and a length of 703 mm.

(Lithium-ion Secondary Cell D)

A cylindrical lithium-ion secondary cell D having a theoretical capacity of 1,600 mAh and a positive-electrode plate area per capacity of 300 cm$^2$/Ah was prepared in a similar manner to lithium-ion secondary cell A, except that, in preparation of the lithium-ion secondary cell A, the positive electrode was prepared to have an active material amount on one surface of 11.5 mg/cm$^2$, a total thickness after rolling of 80 µm, and a length after cutting of 858 mm and the negative electrode to have an active material amount of 12.1 mg/cm$^2$, a total thickness of 75 µm, and a length of 918 mm.

(Lithium-ion Secondary Cell E)

A cylindrical lithium-ion secondary cell E having a theoretical capacity of 1,400 mAh and a positive-electrode plate area per capacity of 400 cm$^2$/Ah was prepared in a similar manner to lithium-ion secondary cell A, except that, in preparation of the lithium-ion secondary cell A, the positive electrode was prepared to have an active material amount on one surface of 8.9 mg/cm$^2$, a total thickness after rolling of 65 µm, and a length after cutting of 1,000 mm, and the negative electrode to have an active material amount of 11.0 mg/cm², a total thickness of 60 μm, and a length of 1,060 mm.

(Lithium-ion Secondary Cell F)

A cylindrical lithium-ion secondary cell F having a theoretical capacity of 1,100 mAh and a positive-electrode plate area per capacity of 800 cm²/Ah was prepared in a similar manner to lithium-ion secondary cell A, except that, in preparation of the lithium-ion secondary cell A, the positive electrode was prepared to have an active material amount on one surface of 4.4 mg/cm², a total thickness after rolling of 40 μm, and a length after cutting of 1,572 mm and the negative electrode to have an active material amount of 8.9 mg/cm², a total thickness of 34 μm, and a length of 1,632 mm.

The 0.2 C discharge capacity and the 5 C discharge capacity of each lithium-ion secondary cell thus prepared were determined under the following conditions. The results are summarized in Table 1.

[0.2 C Capacity]

Each battery was charged to 4.2 V at a current of 1A, and while the battery was discharged at 0.2 C of a designed theoretical capacity, the capacity until the battery voltage decreased to 2.5 V was determined.

[5 C Capacity]

Each battery was charged to 4.2 V at a current of 1A, and while the battery was discharged at 5 C of a designed theoretical capacity, the capacity until the battery voltage decreased to 2.5 V was determined.

TABLE 1

| Cell | Area/capacity (cm²/Ah) | 0.2 C Discharge capacity (Ah) | 5 C Discharge capacity (Ah) | 5 C/0.2 C |
|---|---|---|---|---|
| A | 100 | 2.30 | 0.10 | 0.04 |
| B | 150 | 2.00 | 1.23 | 0.62 |
| C | 200 | 1.80 | 1.75 | 0.97 |
| D | 300 | 1.60 | 1.56 | 0.98 |
| E | 400 | 1.40 | 1.37 | 0.98 |
| F | 800 | 1.10 | 1.09 | 0.99 |

The following hybrid power supply units were prepared and evaluated by using respective lithium-ion secondary cells thus obtained.

<Preparation of Hybrid Power Supply Unit>

Example 1

A battery of one lithium-ion secondary cell A and a battery of one lithium-ion secondary cell F were connected to each other in parallel, to give a hybrid power supply unit.

Example 2

A battery of one lithium-ion secondary cell A and a battery of one lithium-ion secondary cell E were connected to each other in parallel, to give a hybrid power supply unit.

Example 3

A battery of one lithium-ion secondary cell A and a battery of one lithium-ion secondary cell D were connected to each other in parallel, to give a hybrid power supply unit.

Example 4

A battery of one lithium-ion secondary cell B and a battery of one lithium-ion secondary cell F were connected to each other in parallel, to give a hybrid power supply unit.

Example 5

A battery of two lithium-ion secondary cells A connected to each other in parallel and a battery of two lithium-ion secondary cells F connected to each other in parallel were connected to each other in parallel, to give a hybrid power supply unit.

Example 6

A battery of two lithium-ion secondary cells A connected to each other in parallel and a battery of one lithium-ion secondary cell F were connected to each other in parallel, to give a hybrid power supply unit.

Example 7

A battery of two lithium-ion secondary cells A connected to each other in series and a battery of two lithium-ion secondary cells F connected to each other in series were connected to each other in parallel, to give a power supply unit.

Comparative Example 1

Two lithium-ion secondary cells A were connected to each other in parallel, to give a power supply unit.

Comparative Example 2

Two lithium-ion secondary cells B were connected to each other in parallel, to give a power supply unit.

Comparative Example 3

Two lithium-ion secondary cells C were connected to each other in parallel, to give a power supply unit.

Comparative Example 4

Two lithium-ion secondary cells D were connected to each other in parallel, to give a power supply unit.

Comparative Example 5

Two lithium-ion secondary cells E were connected to each other in parallel, to give a power supply unit.

Comparative Example 6

Two lithium-ion secondary cells F were connected to each other in parallel, to give a power supply unit.

Comparative Example 7

A battery of one lithium-ion secondary cell D and a battery of one lithium-ion secondary cell E were connected to each other in parallel, to give a hybrid power supply unit.

The following 0.2 C capacity, maximum pulse discharge current, pulse discharge capacity, pulse discharge efficiency (pulse discharge capacity/0.2 C capacity), C rate (maximum pulse discharge current/0.2 C capacity), and discharge voltage of each power supply units thus prepared were determined. The results are summarized in Table 2.

[0.2 C Capacity]

Each of the power supplies obtained in Examples 1 to 6 and Comparative Examples 1 to 7 was charged to 4.2 V at a current of 1 A, and then, while the power supply was discharged at 0.2 C of a designed theoretical capacity, the capacity until the voltage decreased to 2.5 V was determined. Separately, the power supply obtained in Example 7 was charged to a voltage of 8.4 V at a current of 1A, and then, while the power supply was discharged at 0.2 C of a designed theoretical capacity, the capacity until the voltage decreased to 5.0 V was determined.

[C Rate]

The maximum pulse discharge current of each power supply with respect to its 0.2 C capacity was determined as the C rate.

[Evaluation of Discharge Voltage]

The average discharge voltage of each power supply at the maximum pulse discharge current during continuous pulse discharge was determined.

TABLE 2

|  |  | Batteries connected in parallel | | | Maximum | | | Pulse discharge efficiency [pulse | C rate [maximum pulse | |
| --- | --- | --- | --- | --- | --- | --- | --- | --- | --- | --- |
|  |  | High-capacity battery | | High-power battery | | 0.2 C | pulse discharge | Pulse discharge | discharge capacity/0.2 C | discharge current/0.2 C | Discharge |
|  |  | Cell | Number/ connection | Cell | Number/ connection | Capacity (Ah) | current (A) | capacity (Ah) | capacity] (%) | capacity] (C) | voltage (V) |
| Example | 1 | A | 1 | F | 1 | 3.4 | 98 | 3.24 | 95.3 | 28.8 | 3.40 |
|  | 2 | A | 1 | E | 1 | 3.7 | 54 | 3.48 | 94.1 | 14.6 | 3.37 |
|  | 3 | A | 1 | D | 1 | 3.9 | 42 | 3.66 | 93.8 | 10.8 | 3.36 |
|  | 4 | B | 1 | F | 1 | 3.1 | 102 | 2.96 | 95.5 | 32.9 | 3.40 |
|  | 5 | A | 2/Parallel | F | 2/Parallel | 6.8 | 196 | 6.48 | 95.3 | 28.8 | 3.40 |
|  | 6 | A | 2/Parallel | F | 1 | 5.7 | 81 | 5.46 | 95.8 | 14.2 | 3.39 |
|  | 7 | A | 2/Series | F | 2/Series | 3.4 | 98 | 3.24 | 95.3 | 28.8 | 6.80 |
| Comparative Example | 1 | A | 1 | A | 1 | 4.6 | 17 | 3.70 | 80.4 | 3.7 | 3.23 |
|  | 2 | B | 1 | B | 1 | 4.0 | 26 | 3.24 | 81.0 | 6.5 | 3.24 |
|  | 3 | C | 1 | C | 1 | 3.6 | 36 | 2.96 | 82.2 | 10.0 | 3.26 |
|  | 4 | D | 1 | D | 1 | 3.2 | 54 | 2.66 | 83.1 | 16.9 | 3.28 |
|  | 5 | E | 1 | E | 1 | 2.8 | 62 | 2.36 | 84.3 | 22.1 | 3.30 |
|  | 6 | F | 1 | F | 1 | 2.2 | 148 | 1.94 | 88.2 | 67.3 | 3.33 |
|  | 7 | D | 1 | E | 1 | 3.0 | 72 | 2.72 | 90.7 | 24.0 | 3.34 |

[Maximum Pulse Discharge Current]

Each of the power supplies obtained in Examples 1 to 6 and Comparative Examples 1 to 7 was charged to a voltage of 4.2 V at a current of 1A, and then subjected to continuous pulse discharge while it is turned on for 0.5 second and off for 10 seconds repeatedly. The pulse current was then increased, and the maximum pulse discharge current allowing retention of a voltage of 3.0 V or more at the start of discharge was determined. Separately, the power supply obtained in Example 7 was charged to a voltage of 8.4 V at a current of 1 A and then subjected to continuous pulse discharge while it is turned on for 0.5 second and off for 10 seconds repeatedly, and the maximum pulse discharge current allowing retention of a voltage of 6.0 V or more at the start of discharge was determined, after the pulse current was increased.

[Pulse Discharge Capacity]

Each of the power supplies obtained in Examples 1 to 6 and Comparative Examples 1 to 7 was charged to a voltage of 4.2 V at a current of 1A, and then subjected to continuous pulse discharge at the maximum current above while it is turned on for 0.5 second and off for 10 seconds repeatedly, and the capacity until the voltage decreased to 2.5 V was determined. Separately, the power supply obtained in Example 7 was charged to a voltage of 8.4 V at a current of 1A, and then subjected to continuous pulse discharge at the maximum current above while it is turned on for 0.5 second and off for 10 seconds repeatedly, and the capacity until the voltage decreased to 5.0 V was determined.

[Pulse Discharge Efficiency]

The percentage of the pulse discharge capacity of each power supply with respect to its 0.2 C capacity was designated as the pulse discharge efficiency.

As shown in Table 2, each of the hybrid power supply units obtained in Examples 1 to 4 has generated a pulse discharge capacity higher than that in average of the power supplies obtained in Comparative Example 1 to 6 in which the corresponding battery groups having the same discharge characteristics as those in the Examples are connected to each other in parallel, indicating that the hybrid power supply was improved in high-load characteristics. It is because the high-power nonaqueous electrolyte battery groups are discharged at large current when the discharge is turned on and the high-power nonaqueous electrolyte battery groups are charged by the high-capacity nonaqueous electrolyte battery groups when the discharge is turned off, and thus, the distribution of lithium ion in the battery is uniformized more positively, compared to a power supply containing only a single kind of nonaqueous electrolyte battery in which such charging is not performed. For that reason, even when pulse discharge is repeated at large current, the power supply is protected from voltage drop and resistant to deterioration in pulse discharge capacity more than a power supply unit containing only a high-capacity or high-power nonaqueous electrolyte battery. The power supply of Comparative Example 7 having a lithium-ion secondary cell different in the plate area of the positive electrode per capacity does not improve high-load characteristics sufficiently, because there is no difference in discharge characteristics of each battery group at between 0.2 C and 5 C.

In addition, it has been shown that the power supplies of Examples 5 to 7 having the battery group containing two nonaqueous electrolyte cells connected in parallel or in series make it possible to increase the capacity and voltage without deterioration in high-load characteristics.

As described above, a hybrid power supply, comprises a high-capacity nonaqueous electrolyte battery group and a high-power nonaqueous electrolyte battery group different in discharge characteristics connected to each other in parallel. The high-capacity nonaqueous electrolyte battery group has a 0.2 C discharge capacity per cell greater than that of the high-power nonaqueous electrolyte battery group, and the high-power nonaqueous electrolyte battery group has a rate of 5 C discharge capacity per cell to 0.2 C discharge capacity per cell (5 C discharge capacity/0.2 C discharge capacity) greater than that of the high-capacity nonaqueous electrolyte battery group.

The hybrid power supply in the configuration above, in which the same kind of high-capacity and high-power nonaqueous electrolyte battery groups are connected to each other in parallel, does not demand additional installation of a complicated control system. Further, during large-current discharge, the high-power nonaqueous electrolyte battery group supplies most of the large current, and during small-current discharge, discharge is performed by both battery groups, and the electricity needed for equilibrating electric potential is charged from the high-capacity nonaqueous electrolyte battery group to the high-power nonaqueous electrolyte battery group, because the batteries are connected to each other in parallel. Thus, distribution of lithium ion in respective batteries is uniformized positively, and the deterioration in voltage by pulse discharge is prevented.

In the hybrid power supply unit in the configuration above, at least one of the high-capacity and high-power nonaqueous electrolyte battery groups preferably contains multiple cells.

In the configuration above, it is possible to provide a hybrid power supply unit containing battery groups different in battery capacity and output voltage, and thus, to prepare a power supply unit optimized for a particular application easily.

In addition, in the hybrid power supply unit in the configuration above, the multiple cells are preferably connected to each other in series.

In the configuration above, it is possible to obtain an output voltage different in each battery group and thus, to prepare a power supply unit optimized for a particular application easily.

Further in the hybrid power supply unit in the configuration above, the multiple cells are also favorably connected to each other in parallel.

In such a configuration, it is possible to obtain discharge load characteristics different in each battery group and thus, to prepare a power supply unit optimized for a particular application easily.

The hybrid power supply unit can provide a power supply unit in combination of the same kinds of nonaqueous electrolyte batteries satisfying both requirements in high-capacity characteristics for allowing long-term continuous discharge and also in high-power characteristics for allowing pulse discharge at large current without use of a complicated control system.

This application is based on Japanese Patent Application No. 2006-007374 filed on Jan. 16, 2006, the contents of which are hereby incorporated by reference.

Although the present invention has been fully described by way of example with reference to the accompanying drawing, it is understood that various changes and modifications will be apparent to those skilled in the art. Therefore, unless otherwise such changes and modifications depart from the scope of the present invention hereinafter defined, they should be construed as being included therein.

What is claimed is:

1. A hybrid power supply unit, comprising a high-capacity nonaqueous electrolyte battery group and a high-power nonaqueous electrolyte battery group different in discharge characteristics connected to each other in parallel, wherein;
   a difference in electrode plate area per capacity between a positive electrode of the high-capacity nonaqueous electrolyte battery group and a positive electrode of the high-power nonaqueous electrolyte battery group is more than 100 $cm^2$/Ah,
   said high-capacity nonaqueous electrolyte battery group has a 0.2 C discharge capacity per cell greater than that of said high-power nonaqueous electrolyte battery group, and
   said high-power nonaqueous electrolyte battery group has a rate of 5 C discharge capacity per cell to 0.2 C discharge capacity per cell (5 C discharge capacity/0.2 C discharge capacity) greater than that of said high-capacity nonaqueous electrolyte battery group.

2. The hybrid power supply unit according to claim 1, wherein at least one of said high-capacity nonaqueous electrolyte battery group and said high-power nonaqueous electrolyte battery group contains multiple cells.

3. The hybrid power supply unit according to claim 2, wherein said multiple cells are connected in series.

4. The hybrid power supply unit according to claim 2, wherein said multiple cells are connected in parallel.

* * * * *